US 11,163,651 B1

(12) United States Patent
Patil et al.

(10) Patent No.: US 11,163,651 B1
(45) Date of Patent: Nov. 2, 2021

(54) AUTOMATED DATA RESTORE

(71) Applicant: International Business Machines Corporation, Armonk, NY (US)

(72) Inventors: Vijay S. Patil, Bangalore (IN); Sahadev Dey, Bengaluru (IN); Rajiv Sundaramurthy, Villupuram (IN); Amit Patra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/866,476

(22) Filed: May 4, 2020

(51) Int. Cl.
*G06F 12/00* (2006.01)
*G06F 11/14* (2006.01)
*G06F 3/06* (2006.01)

(52) U.S. Cl.
CPC ........ *G06F 11/1469* (2013.01); *G06F 3/0619* (2013.01); *G06F 3/0653* (2013.01); *G06F 3/0673* (2013.01); *G06F 11/1448* (2013.01); *G06F 11/1451* (2013.01); *G06F 11/1458* (2013.01); *G06F 11/1461* (2013.01); *G06F 11/1464* (2013.01); *G06F 11/1466* (2013.01)

(58) Field of Classification Search
CPC ............... G06F 11/149; G06F 11/1466; G06F 11/1458; G06F 11/1448; G06F 3/0619; G06F 3/0673; G06F 3/0653; G06F 11/1451; G06F 11/1461
See application file for complete search history.

(56) References Cited

U.S. PATENT DOCUMENTS

| 8,862,560 | B1 * | 10/2014 | Wu .................. G06F 16/217 |
| | | | 707/693 |
| 9,823,814 | B2 | 11/2017 | Anand et al. |
| 10,198,326 | B2 | 2/2019 | Schucker et al. |
| 2019/0250998 | A1 | 8/2019 | Bedadala et al. |
| 2019/0332304 | A1 * | 10/2019 | Altman .................. G06F 3/061 |
| 2021/0232319 | A1 * | 7/2021 | Reddy A V ......... G06F 9/45558 |

OTHER PUBLICATIONS

"Backup and recovery," IBM Knowledge Center, 2 pages. https://www.ibm.com/support/knowledgecenter/en/ssw_ibm_i_74/rzahg/rzahgbackup.htm.
"Robot Save: Data Backup Management Software for IBM i," Help Systems, 5 pages. https://www.helpsystems.com/products/data-backup-management-software-ibm-i.
"Monitoring sufficient disk space for restoring backups," DataStax Documentation, 3 pages. https://docs.datastax.com/en/opscenter/6.5/opsc/online_help/services/monitorDiskSpaceRestores.html.
"Online Backup and Disaster Recovery for IBM i," iSeries Online Backup, 4 pages. http://iseriesonlinebackup.com/.
(Continued)

*Primary Examiner* — John A Lane
(74) *Attorney, Agent, or Firm* — Yee & Associates, P.C.

(57) ABSTRACT

A method, apparatus, system, and computer program product for restoring data. The restoring of the data to a storage system from a storage medium is initiated by a computer system. Changes to an amount of space available in the storage system to restore the data are identifies by the computer system, while the data is being restored to the storage system. A restoring of the data to the storage system is placed on hold by the computer system when an amount of space needed to complete restoring the data is greater than the amount of space available to restore the data.

20 Claims, 8 Drawing Sheets

(56) References Cited

OTHER PUBLICATIONS

"Protecting iSeries AS/400: Backing up licensed internal code and certain system libraries," Unitrends, Jul. 31, 1 page. https://support.unitrends.com/UnitrendsBackup/s/article/000005993.

"Recall command: Recalling a specific migrated data set," IBM Knowledge Center, 2 pages. https://www.ibm.com/support/knowledgecenter/SSLTBW_2.3.0/com.ibm.zos.v2r3.arcf000/hr1023.htm.

"Restoring objects," IBM Knowledge Center, 2 pages. https://www.ibm.com/support/knowledgecenter/ssw_ibm_i_73/rzarm/rzarmrstindobj.htm.

* cited by examiner

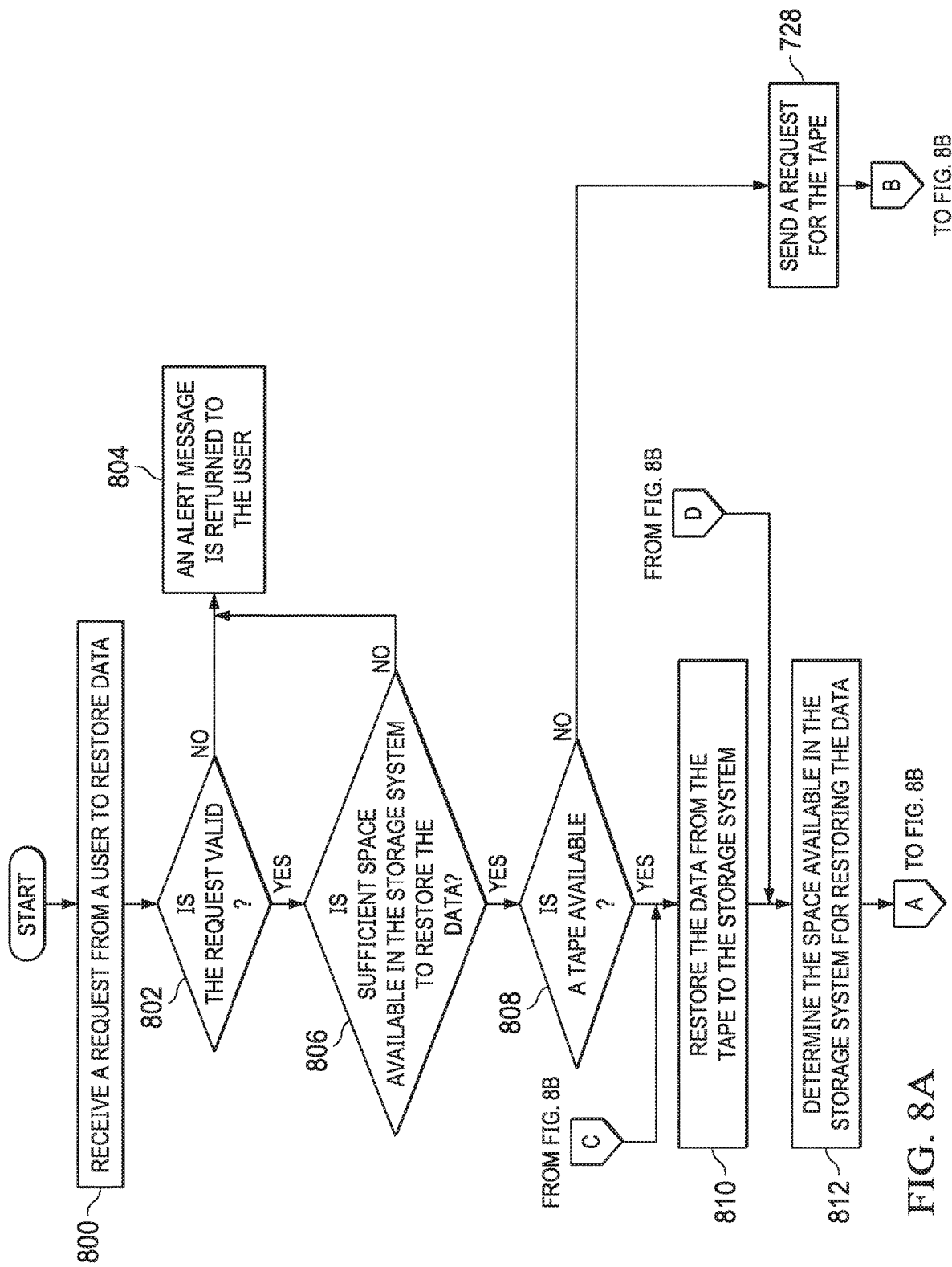

AUTOMATED DATA RESTORE

BACKGROUND

1. Field

The disclosure relates generally to an improved computer system and, more specifically, to a method, apparatus, system, and computer program product for restoring data in a computer system.

2. Description of the Related Art

Data is often backed up for the purpose of being able to restore the data at a later time. For example, a backup of the data can copy files and folders. This backup can be made to various mediums such as a hard disk, a tape, an optical disk, or other types of mediums. Magnetic tape is often used because of the low cost as compared to other media.

Data can be restored from a backup media in an event of a data loss. The data loss can be caused by a virus, a hardware file, corruption, or other causes. Additionally, the data can be restored from a backup when a prior version of the data is desired. For example, data restoration can be performed for a particular piece of data such as a file or an object from a specific date in a particular directory or library that has been saved on a backup media such as a tape, which can be a magnetic tape or an optical tape. With the magnetic tape, a restoration process can involve steps such as submitting service requests and arranging for one or more tapes from an off-site location to be retrieved for use in performing the data restoration.

SUMMARY

According to one embodiment of the present invention, a method restores data. The restoring of the data to a storage system from a storage medium is initiated by a computer system. Changes to an amount of space available to restore in the storage system the data are identifies by the computer system, while the data is being restored to the storage system. A restoring of the data to the storage system is placed on hold by the computer system when an amount of space needed to complete restoring the data is greater than the amount of space available to restore the data.

According to another embodiment of the present invention a data restore system comprises a computer system that determines whether a sufficient space is available in a storage system to restore data to the storage system. The computer system restores the data to the storage system when the sufficient space is available in the storage system to restore the data to the storage system. The computer system identifies changes to an amount of space available in the storage system to restore the data while the data is being restored to the storage system. The computer system places restoring of the data to the storage system on hold when the amount of space needed to complete restoring the data is greater than the amount of space available.

According to yet another embodiment of the present invention, a computer program product for restoring data comprises a computer-readable-storage media with first program code, second program code, and third program code stored on the computer-readable storage media. The first program code is executable by a computer system to cause the computer system to initiate restoring of the data to a storage system from a storage medium. The second program code is executable by the computer system to cause the computer system to identify changes to an amount of space available in the storage system to restore the data while the data is being restored to the storage system. The third program code is executable by the computer system to cause the computer system to place a restoring of the data to the storage system on hold when an amount of space needed to complete restoring the data is greater than the amount of space available to restore the data.

BRIEF DESCRIPTION OF THE DRAWINGS

FIGS. 8A-8B are a flowchart of a process for restoring data from a tape in accordance with an illustrative embodiment.

DETAILED DESCRIPTION

Figure 1:
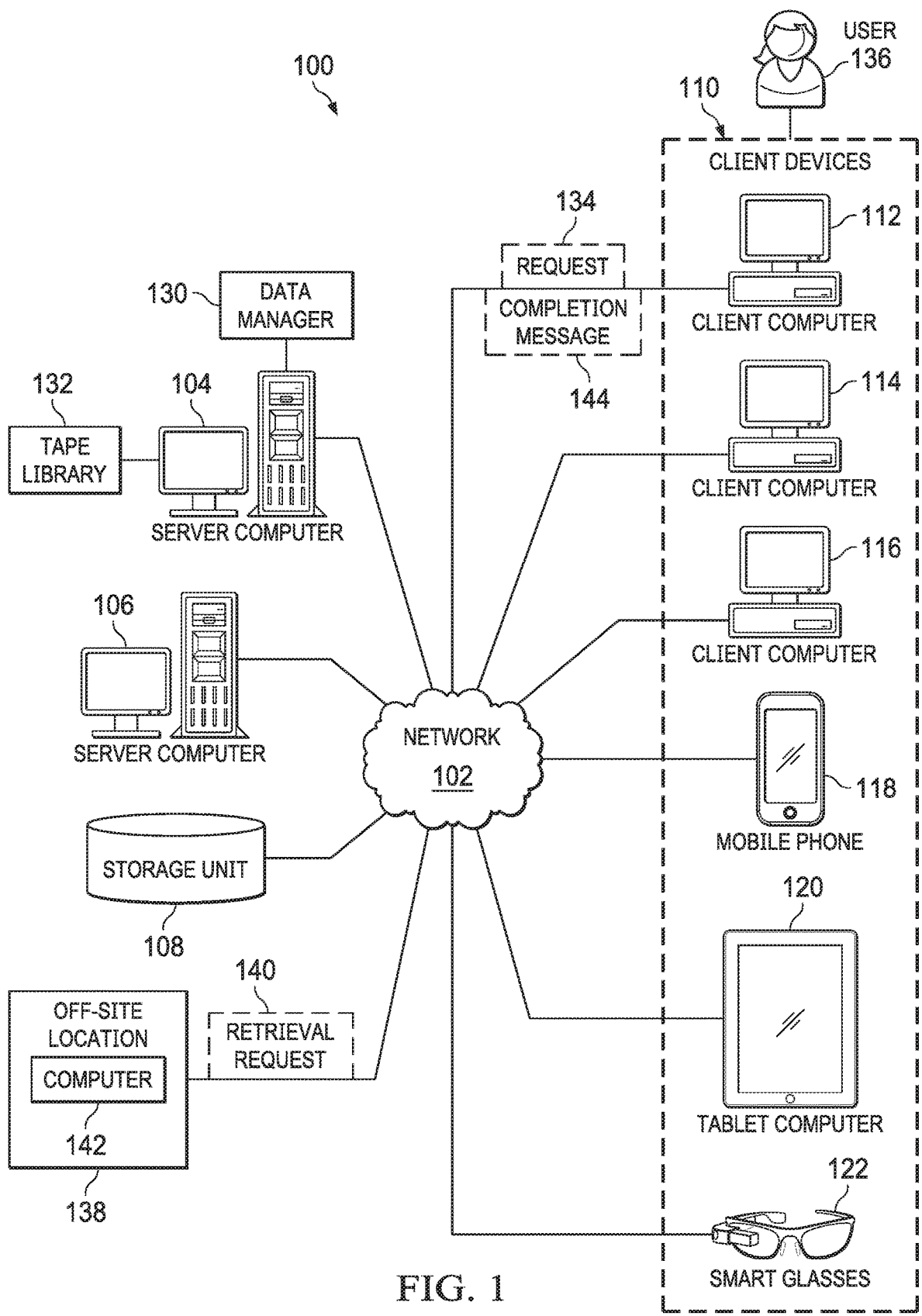
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that currently used data restoration processes to restore data from backup media such as tapes can be more time-consuming than desired. The illustrative embodiments recognize and take into account that current processes involve lengthy tape handling steps that increase the amount of time that a customer or other requester waits for the data to be restored. The illustrative embodiments also recognize and take into account that currently used tape processes do not analyze the space needed in a storage system for data restoration. Further, the illustrative embodiments recognize and take into account that current restoration processes do not determine whether a particular tape is available. The illustrative embodiments also recognize and take into account that current techniques do not monitor space usage as the data is restored.

Thus, the illustrative embodiments provide a method, an apparatus, a system, and a computer program product for restoring data. In one illustrative example, a method restores data. The restoring of the data to a storage system from a storage medium is initiated by a computer system. Changes to an amount of space available to restore the data are identified by the computer system, while the data is being restored to the storage system. A restoring of the data to the storage system is placed on hold by the computer system when an amount of space needed to complete restoring the data is greater than the amount of space available to restore the data.

In another illustrative example, a method restores data. A determination is made as to whether a sufficient space is available in a storage system to restore the data to the storage system. The data is restored to the storage system when the sufficient space is available in the storage system to restore the data. Changes to an amount of space available are identified while the data is being restored. The restoring of the data to the storage system is placed on hold when the amount of space needed to complete restoring the data is greater than the amount of space available. The restoring of the data to the storage system resumes when the amount of space needed to complete restoring the data is no longer greater than the amount of space available. Thus, one or more the illustrative examples provide an automated data restore.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, data manager 130 operates to manage backing up or restoring data for various data processing systems in network data processing system 100. As depicted, the processes in data manager 130 can be implemented in a number of different programming or scripting languages. Any programming or scripting language can be used that allows for implementing the steps described in the illustrative examples. For example, data manager 130 can be implemented using at least one of IBM i Control Language (CL) or Report Program Generator (RPG).

In this illustrative example, backups can be made to tapes that are stored in tape library 132. Tape library 132 is a physical storage system that contains one or more tape drives and a number of slots for storage units for holding tapes. In this illustrative example, the tapes are magnetic tapes. Tape library 132 can also be referred to as a tape silo, a tape robot, or a tape juke box.

In the illustrative example, request 134 can be received by data manager 130 to restore data from user 136 at client computer 112 to restore data to client computer 112. In another example, the data can be restored in another location such as in server computer 104 or server computer 106 for use by user 136 at client computer 112.

When the request is received, a determination is made as to whether sufficient disk space is present in the storage system in which the data is to be restored. For example, if data is to be restored to a storage system such as a solid-state drive (SSD) in client computer 112, the disk usage in the solid-state disk drive is analyzed to determine whether the space available for new data is sufficient for restoring the data requested.

If the amount of space available is sufficient for restoring the data, data manager 130 determines whether the tape is available. In this illustrative example, the tape is considered to be available if the tape is located in tape library 132. If the tape is at another location such as off-site location 138, the tape is not available for restoring the data in this example. In this situation, data manager 130 sends retrieval request 140 to computer 142 to off-site location 138 to retrieve the tape. This request can be, for example, an email message, a text message, or some other suitable request to have the tape made available for use in tape library 132 to restore the data.

In this illustrative example, data manager 130 can monitor for the presence or availability of the tape in tape library 132.

For example, data manager 130 can scan the inventory of tapes in tape library 132 to determine whether the tape needed is present. As another example, data manager 130 can receive a message indicating that the tape is available in tape library 132.

When the tape is available, the process begins the data restoration process to restore the data to the solid-state drive in client computer 112. In this illustrative example, data manager 130 analyzes space usage in the solid-state drive as the data is restored. If data manager 130 determines that insufficient space is available to complete the restoring of the data, the data restoration process is put on hold instead of terminating. In some cases, another process may write data to the solid-state storage device such that sufficient space is no longer available to complete restoring the data.

In this illustrative example, data manager 130 can resume restoring the data when sufficient space is available. Data manager 130 can determine whether the sufficient space is available by analyzing disk usage. In another illustrative example, the determination can be made by data manager 130 receiving a user input from user 136 indicating that the data restoration process can continue. When the data has been restored, data manager 130 can then send completion message 144 to user 136.

As a result, the restoring of data can be performed more efficiently as compared to current techniques through analyzing the amount of disk space available prior to restoring the data. Further, a determination is made as to whether the tape containing the data is available. If the tape is unavailable, the process automatically sends a request to retrieve the tape. Further, the space available on the storage system is monitored as the data is restored. If insufficient data is available to complete the restoration of the data, the process can be put on hold until space is made available.

Figure 2:
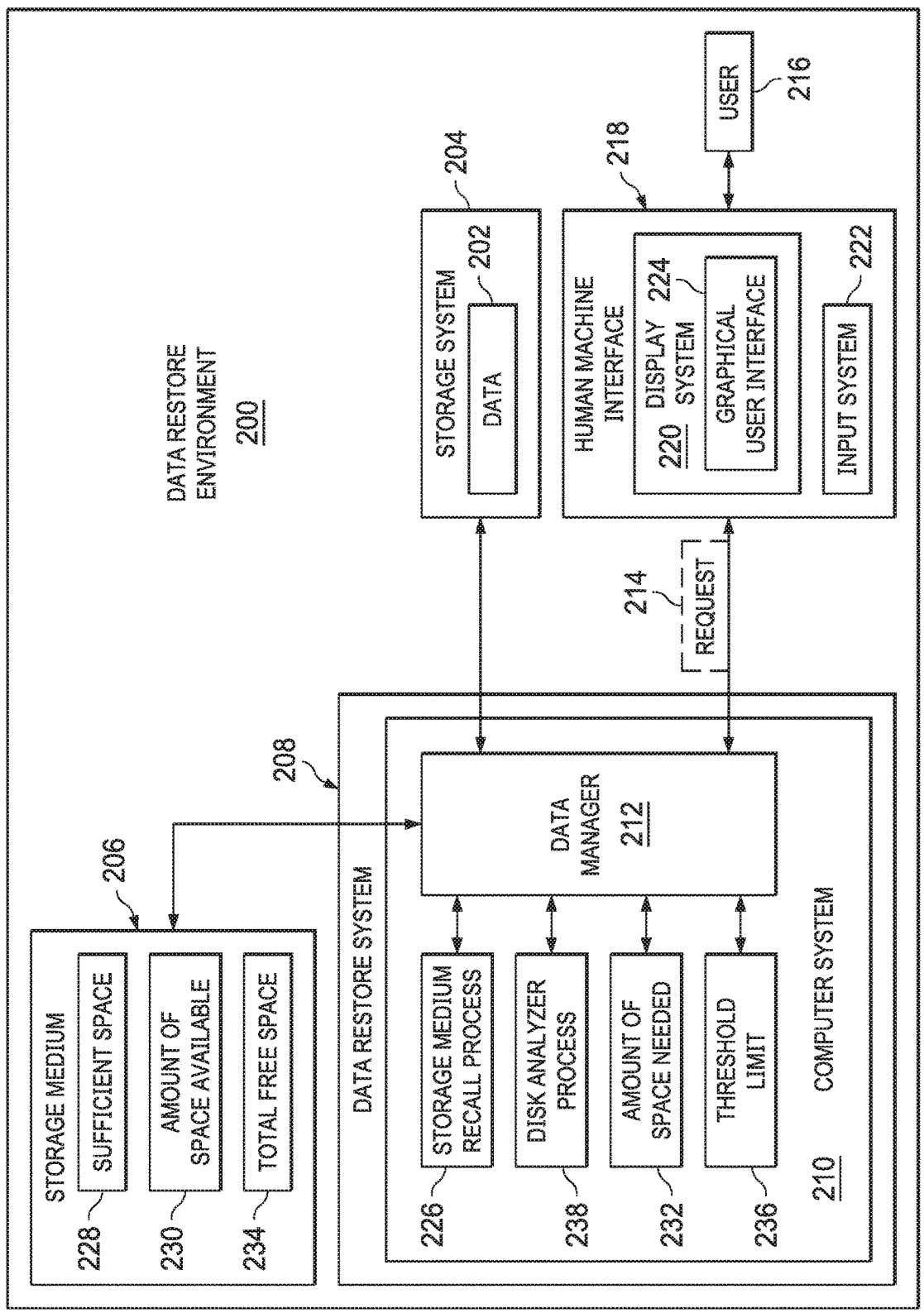
FIG. 2 is a block diagram of a data restore environment in accordance with an illustrative embodiment.

With reference now to FIG. 2, a block diagram of a data restore environment is depicted in accordance with an illustrative embodiment. In this illustrative example, data restore environment 200 includes components that can be implemented in hardware such as the hardware shown in network data processing system 100 in FIG. 1.

In this illustrative example, data 202 in data restore environment 200 can be restored to storage system 204. Data 202 can take a number of different forms. Data 202 can be at least one of a file, a program, an application, a configuration file, an object, a directory, a web page, an image, an audio, a video, a database, a table, a spreadsheet, a drawing, a model, an executable file, a piece of code, or some other type of data.

As depicted, storage system 204 is a physical storage and can also include software. Storage system 204 can be in a single location or can be distributed. In the illustrative example, a number of storage devices are located in storage system 204. The number of storage devices can be selected from at least one of a hard disk drive, a solid-state disk drive, a flash drive, or some other suitable type of storage device. The type of storage device in storage system 204 can be selected based on desired performance in accessing data.

In this illustrative example, data 202 can be restored to storage system 204 from storage medium 206. In this example, storage medium 206 is any physical medium that is used to store data 202 for backup or archival purposes. For example, storage medium 206 can be one of a tape, a magnetic tape, an optical tape, an optical disk, a hard drive, and other suitable types of storage mediums for storing data 202. In one illustrative example, storage medium 206 is a medium that does not have performance that is as high or with desired characteristics as compared to the storage medium used in storage system 204. For example, when storage medium 206 is a magnetic tape, that tape is accessed sequentially and cannot be accessed in a more random manner as on a hard disk drive or a solid-state disk drive that may be used in storage system 204. Further, the tape may be stored in a tape library and moved by a robotic arm to be placed into a tape drive for access which reduces the speed at which data 202 can be accessed in storage medium 206.

In this illustrative example, data 202 can be restored to storage system 204 from storage medium 206 using data restore system 208. As depicted, data restore system 208 comprises computer system 210 and data manager 212. Data manager 212 is located in computer system 210. Data manager 130 in FIG. 1 is an example of data manager 212.

Data manager 212 can be implemented in software, hardware, firmware, or a combination thereof. When software is used, the operations performed by data manager 212 can be implemented in program code configured to run on hardware, such as a processor unit. When firmware is used, the operations performed by data manager 212 can be implemented in program code and data and stored in persistent memory to run on a processor unit. When hardware is employed, the hardware may include circuits that operate to perform the operations in data manager 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

In this illustrative example, data manager 212 in computer system 210 can operate to perform a number of different steps. For example, data manager 212 can receive request 214 to restore data 202. In response to receiving request 214, data manager 212 can determine whether storage medium 206 containing data 202 to be restored is available.

As depicted, request 214 can be generated by user 216 operating human machine interface (HMI) 218. In this example, user 216 can be, for example, a human operator, a data processing system, or software running on a data processing system.

As depicted, human machine interface 218 includes display system 220 and input system 222 that can be operated by user 216 when user 216 is a human operator. Display system 220 is a physical hardware system and includes one or more display devices on which graphical user interface 224 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 can interact with graphical user interface 224 through user input generated by input system 222 for computer system 210. Input system 222 is a physical hardware system and can be selected from at least one of a mouse, a keyboard, a trackball, a touchscreen, a stylus, a motion sensing input device, a gesture detection device, a cyber glove, or some other suitable type of input device.

Data manager 212 can initiate storage medium recall process 226 for storage medium 206 when storage medium 206 is unavailable. In this illustrative example, storage medium recall process 226 can recall or retrieve storage medium 206 in a number of different ways. For example, storage medium recall process 226 can send at least one of an email message, a text message, or some other type of communication to a human operator at the location of the storage medium to return storage medium 206 to a location where storage medium 206 can be used to restore data 202 to storage system 204. In other illustrative examples, storage medium recall process 226 can be an automated process in which a message is sent to the location in which storage medium 206 is located. This message can be sent to a computer control system to transport storage medium 206 from the remote location to the current location for use in restoring data 202.

For example, when storage medium 206 is a tape, the restoring of data 202 from the tape is to be performed at a local tape library. However, the tape may be located in a remote tape library in another location. Storage medium recall process 226 can send a communication to the remote tape library to transport the tape back to the local tape library in which the tape is used to restore data 202 to storage system 204. In this example, an automated transport system can be used to transport storage medium 206 from the remote tape library to the local tape library such that the tape is available for restoring data 202 to storage system 204.

For example, data manager 212 can determine whether sufficient space 228 is available in storage system 204 to restore data 202 to storage system 204. Data manager 212 can restore data 202 to storage system 204 when sufficient space 228 is available in storage system 204 to restore data 202 to storage system 204.

In this example, data manager 212 can initiate restoring of data 202 to storage system 204 from storage medium 206. Additionally, data manager 212 can identify changes to amount of space available 230 in storage system 204 while data 202 is being restored to storage system 204 from storage medium 206.

As depicted, data manager 212 can place the restoring of data 202 to storage system 204 on hold when amount of space needed 232 to complete restoring of data 202 is greater than amount of space available 230 in storage system 204. In this illustrative example, amount of space available 230 may not be the remaining amount of space in storage system 204 but can be some part of the remaining amount of space in storage system 204. For example, amount of space available 230 in storage system 204 can be total free space 234 in storage system 204 as adjusted by threshold limit 236. For example, threshold limit 236 may reserve one gigabyte of space, three gigabytes of space, or some percentage of total free space 234.

The determination of amount of space needed 232 and amount of space available 230 can be made by data manager 212 in response to an event. This event can be, for example, a periodic event or a non-periodic event. For example, the determination can be made each time a period of time passes. The period of time can be, for example, one millisecond, one nanosecond, three nanoseconds, or some other period of time.

As another illustrative example, the determination of amount of space needed 232 and amount of space available 230 can be made each time a selected amount of data 202 has been restored to storage system 204. For example, the determination can be made after ten kilobytes of data, one megabyte of data, or some other amount of data has been restored in storage system 204.

Thus, when the amount of space still needed is greater than threshold limit 236 for amount of space available 230, restoring of data 202 is put on hold. The process can resume at a later time when amount of space available 230 is sufficient to restore the remaining amount of data 202 from storage medium 206.

As depicted, when the restoring of data 202 is placed on hold, data manager 212 can determine whether amount of space needed 232 is less than amount of space available 230 after a period of time passes subsequent to placing the restoring of data 202 to storage system 204 on hold. This determination can be made in a number of different ways.

For example, a message can be sent to user 216 using human machine interface 218 and user input can be received to continue restoring data 202 or indicate that amount of space available 230 is greater than amount of space needed 232 to restore data 202. In other illustrative examples, the determination can be made by data manager 212 using disk analyzer process 238. In this illustrative example, disk analyzer process 238 comprises program code run on a processor to check a driver space and usage.

Data manager 212 can resume restoring data 202 to storage system 204 when amount of space needed 232 to complete restoring of data 202 is no longer greater than amount of space available 230. With this process, data manager 212 can repeatedly place restoring of data 202 on hold and resume restoring of data 202 until data 202 has been stored.

In another illustrative example, the restoring of data 202 can be canceled if a timeout occurs. This timeout can be a period of time such as five minutes, 11 minutes, one hour, five hours, two days, or some other period of time.

In some instances, storage medium 206 can be moved to different locations. In this case, the availability of storage medium 206 is another parameter used to determine whether to restore data 202. For example, data manager 212 can restore data 202 from storage medium 206 to storage system 204 when sufficient space 228 is available in storage system 204 to restore data 202 and storage medium 206 for restoring of data 202 is available.

In one illustrative example, one or more technical solutions are present that overcome a technical problem with current techniques for restoring data from storage media such as tapes. As a result, one or more illustrative examples may provide a technical effect of reducing the time needed to restore data from a tape.

In the illustrative example, computer system 210 can be configured to perform at least one of the steps, operations, or actions described in the different illustrative examples using software, hardware, firmware, or a combination thereof. As a result, computer system 210 operates as a special purpose computer system in which data manager 212 in computer system 210 enables restoring data from a storage media. In particular, data manager 212 transforms computer system 210 into a special purpose computer system as compared to currently available general computer systems that do not have data manager 212.

In the illustrative example, the use of data manager 212 in computer system 210 integrates processes into a practical application for restoring data that increases the performance of computer system 210. The performance of computer system 210 can be increased because the speed at which data can be restored to a storage system for a storage media is increased as per the current techniques for restoring data. In other words, data manager 212 in computer system 210 is directed to a practical application of processes integrated into data manager 212 in computer system 210 that determines whether sufficient space is available in a storage system to restore the data to the storage system; restores the data to the storage system when the sufficient space is available in the storage system to restore the data; identifies changes to an amount of space available while the data is being restored; and places a restoring of the data to the storage system on hold when an amount of space needed to complete restoring the data is greater than the amount of space available that results in improving the speed at which data can be restored to a storage system in computer system 210. In this manner, data manager 212 in computer system 210 provides a practical application of restoring data to a storage system in computer system 210 such that the functioning of computer system 210 is improved.

The illustration of data restore environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data manager 212 can operate to restore multiple sets of data to storage system 204 or to one or more storage systems in addition to or in place of storage system 204. These multiple sets of data can be on the same or different storage media.

Figure 3:
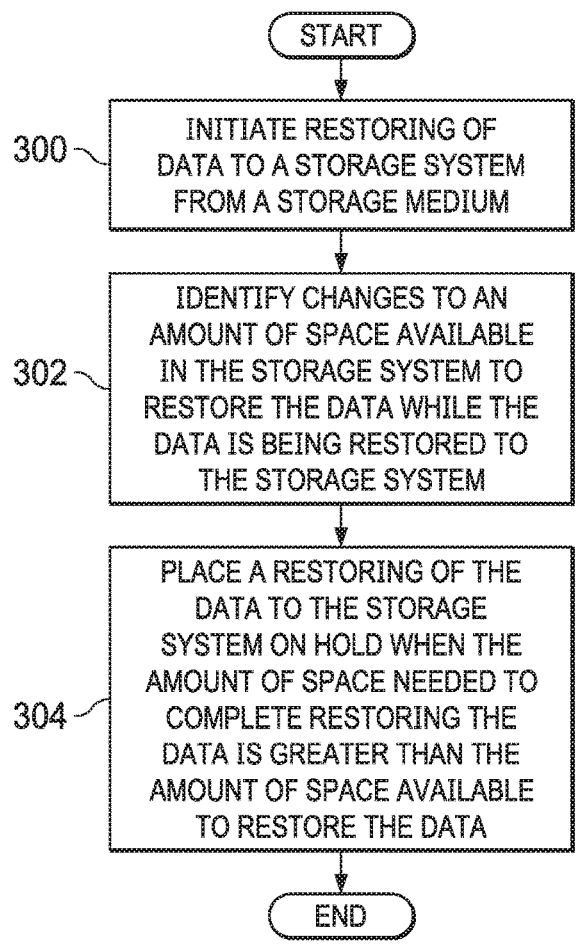
FIG. 3 is a flowchart of a process for restoring data in accordance with an illustrative embodiment.

Turning next to FIG. 3, a flowchart of a process for restoring data is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in data manager 212 in computer system 210 in FIG. 2.

The process begins by initiating restoring of data to a storage system from a storage medium (step 300). The process identifies changes to an amount of space available in the storage system to restore the data while the data is being restored to the storage system (step 302). In step 302, the amount of space available is total free space in the storage system as adjusted by a threshold limit.

The process places a restoring of the data to the storage system on hold when the amount of space needed to complete restoring the data is greater than the amount of space available to restore the data (step 304). The process terminates thereafter.

Figure 4:
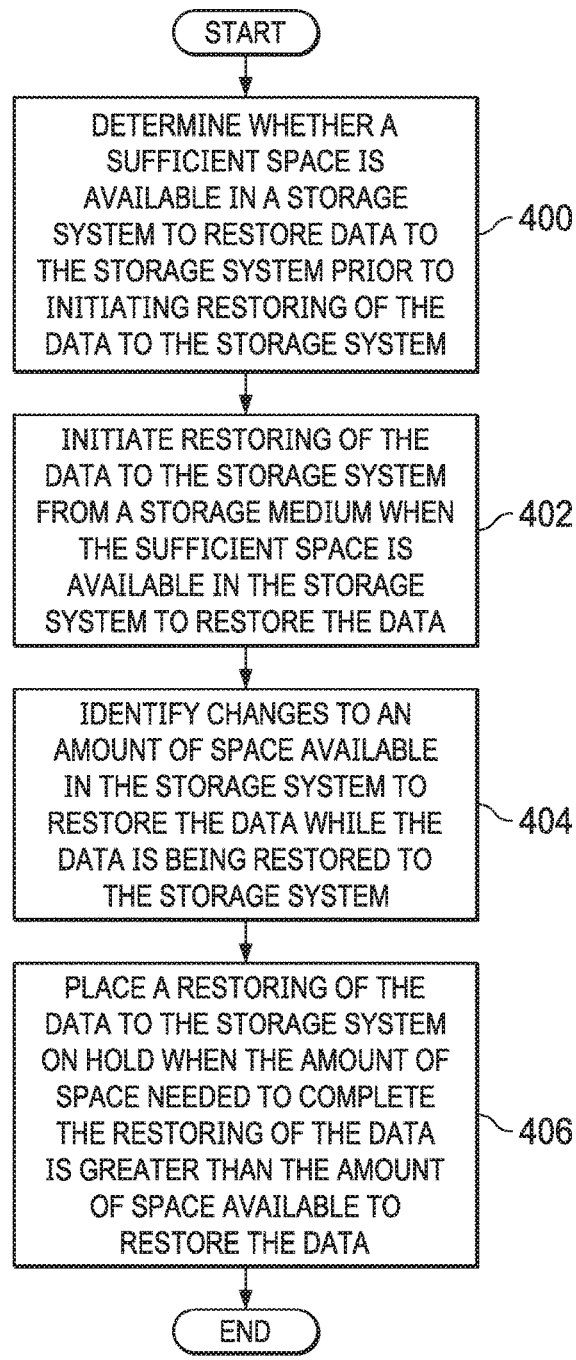
FIG. 4 is a flowchart of a process for restoring data in accordance with an illustrative embodiment.

With reference to FIG. 4, a flowchart of a process for restoring data is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in data manager 212 in computer system 210 in FIG. 2.

The process begins by determining whether a sufficient space is available in a storage system to restore data to the storage system prior to initiating restoring of the data to the storage system (step 400). The process initiates the restoring of the data to the storage system from a storage medium when the sufficient space is available in the storage system to restore the data (step 402).

The process identifies changes to the amount of space available in the storage system to restore the data while the data is being restored to the storage system (step 404). In step 404, the amount of space available is total free space in the storage system as adjusted by a threshold limit.

The process places the restoring of the data to the storage system on hold when the amount of space needed to complete restoring the data is greater than the amount of space available to restore the data (step 406). The process terminates thereafter.

Figure 5:
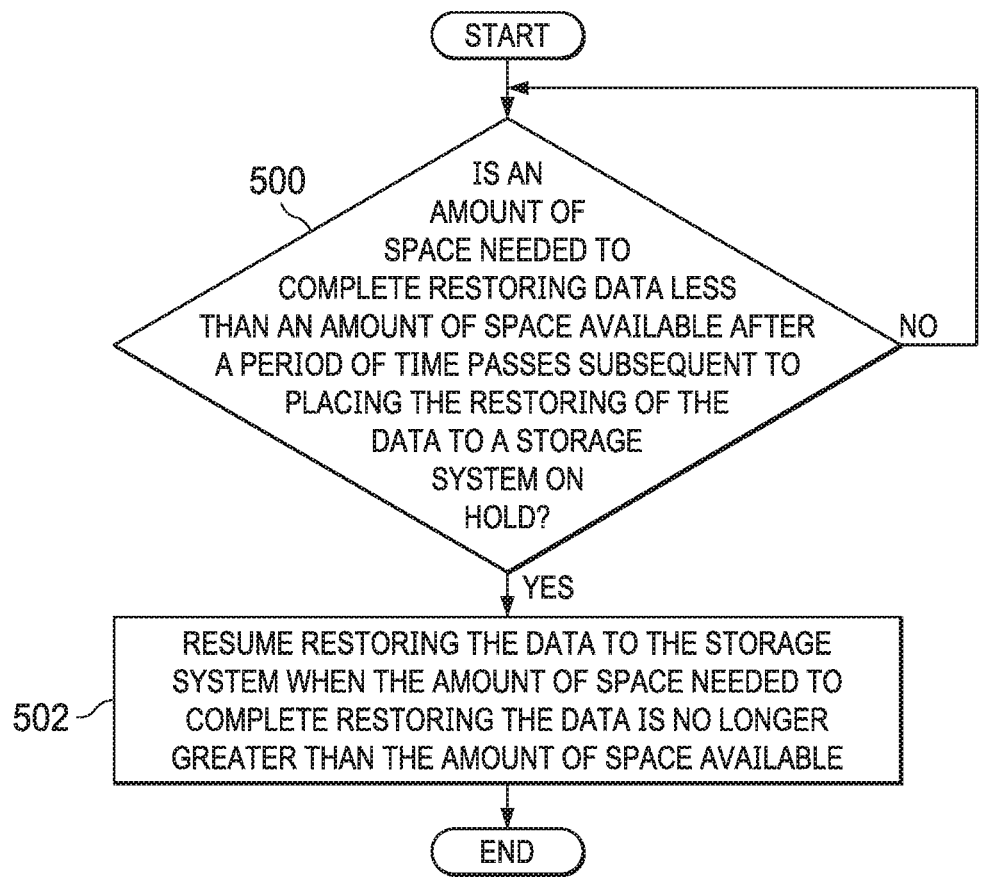
FIG. 5 is a flowchart of a process for resuming restoring data in accordance with an illustrative embodiment.

Turning to FIG. 5, a flowchart of a process for resuming restoring data is depicted in accordance with an illustrative embodiment. The process in FIG. 5 is an example of steps that can be performed subsequent to step 304 in FIG. 3.

The process begins by determining whether an amount of space needed to complete restoring data is less than an amount of space available after a period of time passes subsequent to placing the restoring of the data to a storage system on hold (step 500). If the amount of space needed to complete the restoring of the data is not less than the amount of space available after a period of time passes subsequent to placing the restoring of the data to the storage system on hold, the process returns to step 500 unless a timeout occurs to end the process.

Otherwise, the process resumes the restoring of the data to the storage system when the amount of space needed to complete the restoring of the data is no longer greater than the amount of space available (step 502). The process terminates thereafter.

Figure 6:
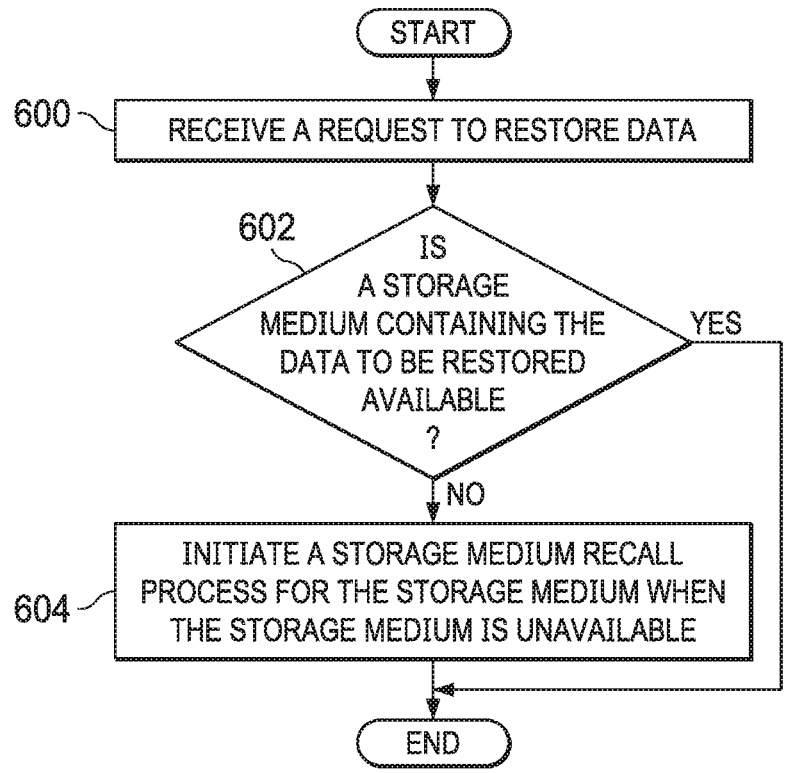
FIG. 6 is a flowchart of a process for determining whether to restore data in accordance with an illustrative embodiment.

With reference now FIG. 6, a flowchart of a process for determining whether to restore data is depicted in accordance with an illustrative embodiment. The process in FIG. 5 is an example of steps that can be performed prior to step 300 in FIG. 3.

The process begins by receiving a request to restore data (step 600). The process determines whether a storage medium containing the data to be restored is available (step 602). If the storage medium is present, the process terminates.

Otherwise, the process initiates a storage medium recall process for the storage medium when the storage medium is unavailable (step 604). The process terminates thereafter. In this example, step 300 can begin when the storage medium becomes available or a timeout occurs.

Figure 7:
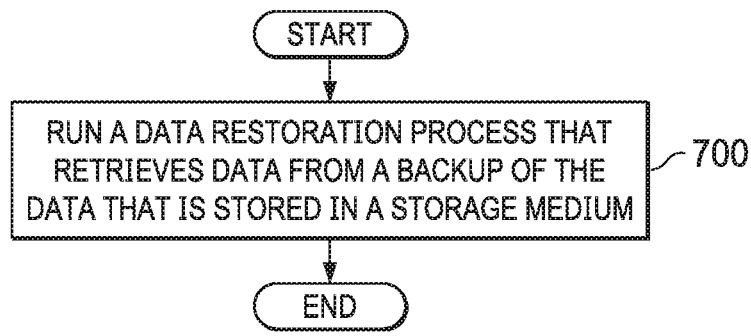
FIG. 7 is a flowchart of a process for restoring data in accordance with an illustrative embodiment.

With reference to FIG. 7, a flowchart of a process for restoring data is depicted in accordance with an illustrative embodiment. The process illustrated in FIG. 7 is an example of one implementation for step 302 in FIG. 3.

The process runs a data restoration process that retrieves data from a backup of the data that is stored in a storage medium (step 700). The process terminates thereafter.

Figure 8B:
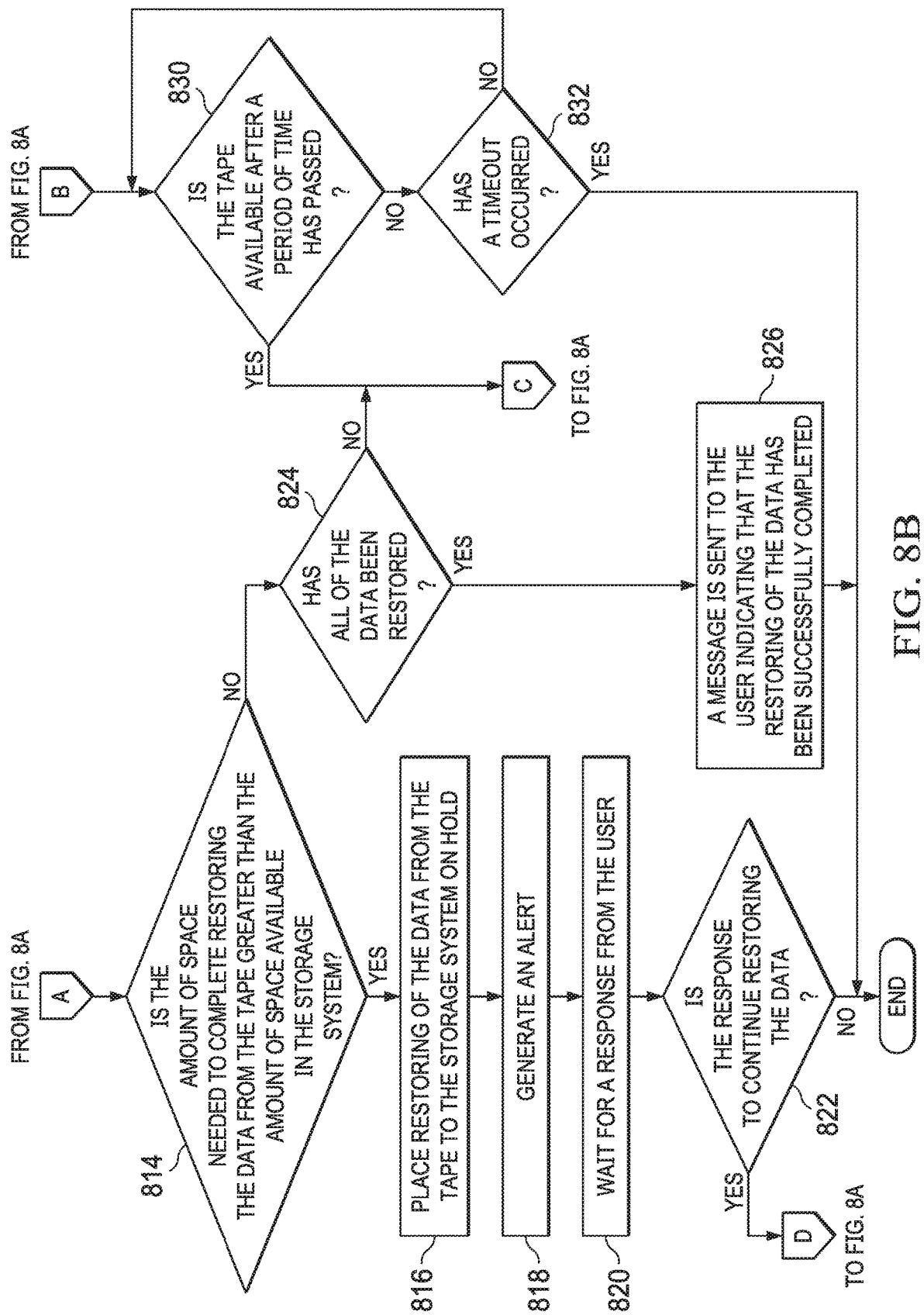

Turning to FIGS. 8A-8B, a flowchart of a process for restoring data from a tape is depicted in accordance with an illustrative embodiment. The process in FIGS. 8A-8B can be implemented in hardware, software, or both. When implemented in software, the process can take the form of program code that is run by one or more processor units located in one or more hardware devices in one or more computer systems. For example, the process can be implemented in data manager 212 in computer system 210 in FIG. 2.

The process begins by receiving a request from a user to restore data (step 800). In step 800, the request can be generated using a human machine interface with the user being a person in this illustrative example.

The request can include object information for the data in an object. The object can be a file in a file system. The object information can include, for example, a file name, a library name of a library containing the file, a saved date, the library name for the restore, and other suitable information. The process determines whether the request is valid (step 802). In step 802, validation is performed with respect to the information in the request. In this illustrative example, a library is an object such as a folder that can hold other objects such as files. In this example, the validation includes determining whether the information is correct. For example, a particular file may not have been saved on the data identified in the request.

If the request is invalid, an alert message is returned to the user (step 804). In step 804, the process generates an alert message that indicates that the request to restore the data cannot be performed. This alert message can be displayed or otherwise presented to the user on a human machine interface (HMI).

For example, the alert message may indicate the reason why the request to restore the data cannot be performed. For example, the alert message may indicate that the request is invalid. For example, the alert message can include details such as the file with the data was not saved on the date specified in the request. As another example, the alert message may indicate that the requested file with the data is not present in the library identified by the library name.

With reference again the step 802, if the request is valid, the process determines whether a sufficient space is available in the storage system to restore the data (step 806). If insufficient space is available in the storage system, the process proceeds to step 804. In this instance, the alert message may indicate that insufficient space is available to restore the data. Further, the alert message may include details such as how much space is needed and how much space is available.

With reference again to step 806, if the sufficient space is available in the storage system to restore the data to the storage system, the process determines whether a tape is available (step 808). In this example, a tape volume or other tape can be identified for use in determining whether the tape is available for restoring of the data.

The availability of the tape can depend on whether the tape is located in a tape library that is in communication with the computer system or a computer in the computer system handling the restoring of the data. For example, if the tape is located in a local tape library that is to be controlled by the data manager and the storage system is in communication with the data manager for restoring the data, then the tape is considered to be available. In some instances, the tape may be located in the tape library that is not directly controlled by the data manager. In this case, a request can be made to relocate the tape from the remote tape library to the local tape library.

If the tape is available, the process restores the data from the tape to the storage system (step 810). While the data is being restored from the tape to the storage system, the process determines the space available in the storage system for restoring of the data (step 812). In step 812, the space available can be the total free space in the storage system. The space available can also be the total free space as adjusted by a threshold limit.

A determination is made as to whether the amount of space needed to complete restoring of the data from the tape is greater than the amount of space available in the storage system (step 814). This determination can be made to detect situations in which other applications, programs, processes, or tasks use storage space. For example, another application may restore other data to the storage system at the same time as the current data is being restored. In another example, another process may write the data to the storage system. In other illustrative examples, the amount of space available in the storage system can increase if other applications, programs, processes, or tasks remove the data from the storage system. For example, an application may remove files or records from the storage system.

This determination can be made any number of different ways in the illustrative example. For example, the amount of space needed to complete the restoring of the data can be greater than the amount of space available if the amount of space available reaches zero and the restoring of the data has not yet completed. In this example, the amount of space available can be total free space as adjusted by a threshold limit. The threshold limit may be an amount of space that can be used for restoring the data. For example, the total threshold limit may be 30 gigabytes and the total free space may be 400 gigabytes. As a result, the space available for restoring the data is the total free space minus 370 gigabytes.

In another illustrative example, the determination can be made by the data identifying the amount of data remaining to be restored as compared to the amount of space available. In this example, the amount of space available can be determined by the total space that is free in the storage system as adjusted by the threshold limit.

If the amount of space needed to complete the restoring of the data is greater than the amount of space available, the process places the restoring of the data from the tape to the storage system on hold (step 816). The process then generates an alert (step 818). In this example, the alert can be sent to the user. The user can be another process or human operator.

The process waits for a response from the user (step 820). The user, software or a person, can perform actions to increase the amount of space available or may choose to no longer continue restoring the data. When a response is received, a determination is made as to whether the response is to continue restoring the data (step 822). If the response is to continue restoring the data, the process returns to step 812. Otherwise, the process terminates.

With reference again to step 814, if the amount of space needed to complete the restoring of the data is not greater than the amount of space available, the process determines whether all of the data has been restored (step 824). If all of the data has been restored, a message is sent to the user indicating that the restoring of the data has been successfully completed (step 826). The process terminates thereafter. If all of the data has not been restored, the process returns to step 810 to continue restoring the data to the storage system.

With reference again to step 808, if the tape is unavailable, the process sends a request for the tape (step 828). The tape may be located in a remote tape library instead of the local tape library. In this case, the request may be emailed to an operator or to an application to have the tape moved from the remote tape library to the local tape library. In another example, the tape may be located in off-site storage, requiring a person to locate and retrieve the tape for restoring the data.

A determination is made as to whether the tape is available after a period of time has passed (step 830). If the tape is unavailable after the period of time has passed, the process determines whether a timeout has occurred (step 832). If a timeout has occurred, the process terminates. Otherwise, the process returns to step 830.

With reference again to step 830, if the tape is available after the period of time has passed, the process then proceeds to step 810.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, the flowchart depicted in FIGS. 8A-8B is directed towards restoring data from a tape. This process can be applied to other types of storage media. For example, the process can be applied to optical discs or removable hard drives in other illustrative examples. As another example, the flowchart in FIGS. 8A-8B illustrates restoring data from a single tape. In other illustrative examples, the data can be located on more than one tape. With more than one tape in tape availability in step 808, a determination can be made to make sure all tapes containing the data to be restored are available. If not all tapes are available, the process can proceed to step 828.

Figure 9:
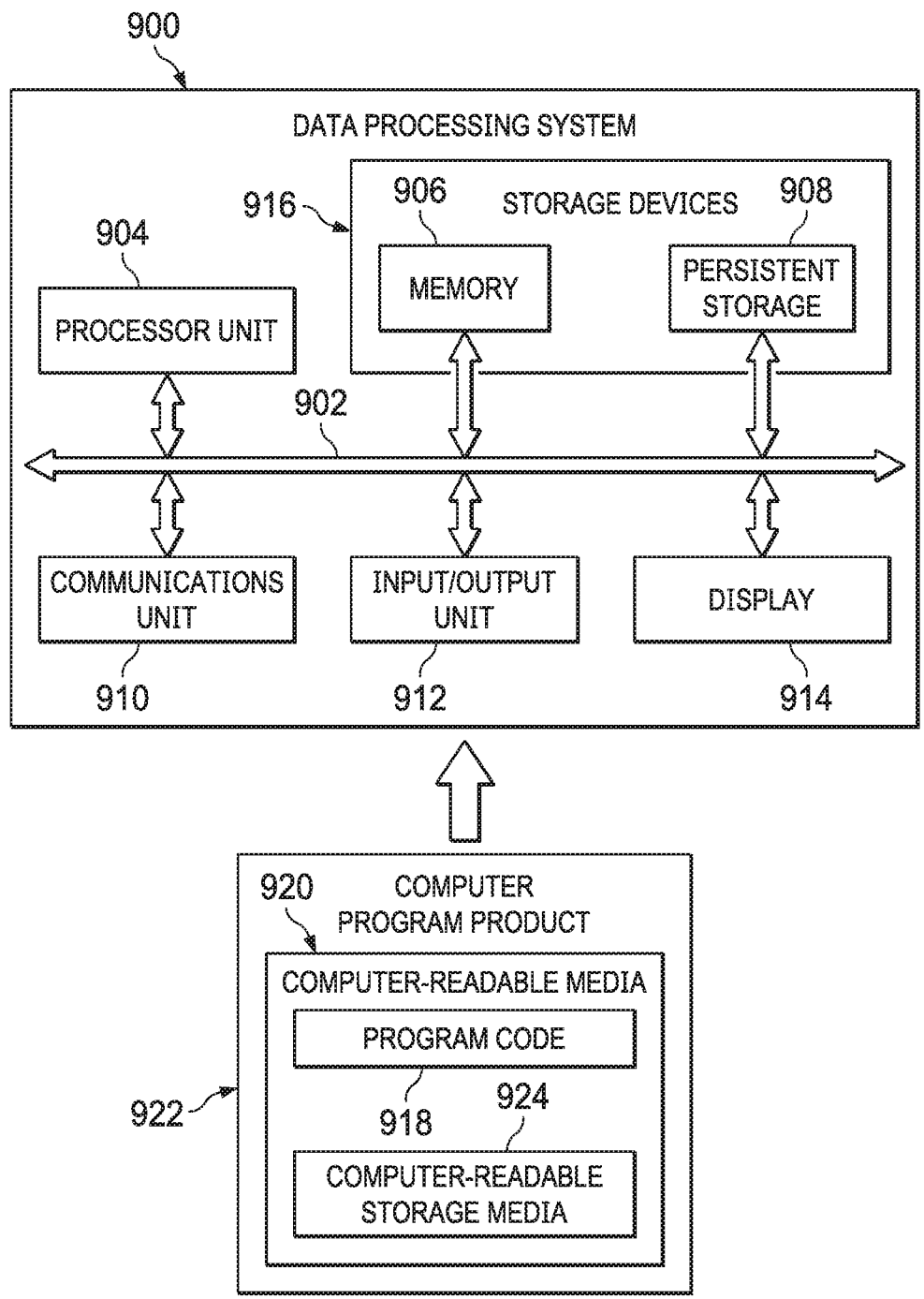
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 210. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative embodiments of the present invention provide a computer implemented method, a computer system, and a computer program product for restoring data. In one illustrative example, the restoring of the data to a storage system from a storage medium is initiated by a computer system. Changes to an amount of space available to restore the data are identified by the computer system, while the data is being restored to the storage system. A restoring of the data to the storage system is placed on hold by the computer system when an amount of space needed to complete the restoring of the data is greater than the amount of space available to restore the data.

In another illustrative example, a determination is made by a computer system as to whether a sufficient space is available in a storage system to restore data to a storage system. The data is restored to the storage system by the computer system when a sufficient space is available in the storage system to restore the data. Changes to an amount of space available are identified by the computer system while the data is being restored. Restoring of the data to the storage system is placed on hold by the computer system when an amount of space needed to complete the restoring of the data is greater than the amount of space available.

In the illustrative example, at least one of data manager 130 or data manager 212 can operate to automate the process of restoring data starting from a request received from a user until the data has been restored to the storage system. In the illustrative example, a tape recall process can be automatically performed to recall a tape if the tape is unavailable. Further, the illustrative example can monitor the amount of space available in the storage system for restoring the data while the data is being restored to the storage system. If the amount of space available is insufficient to restore the data, the storing process can be put on hold until the space needed is made available or the process is canceled. In this manner, when the amount of space available is no longer sufficient to restore the data, the process does not terminate or crash.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for restoring data, the method comprising:
    initiating, by a computer system, restoring of the data to a storage system from a storage medium;
    identifying, by the computer system, changes to an amount of space available in the storage system to restore the data while the data is being restored to the storage system; and
    placing, by the computer system, a restoring of the data to the storage system on hold when an amount of space needed to complete restoring the data is greater than the amount of space available to restore the data.

2. The method of claim 1 further comprising:
    determining, by the computer system, whether a sufficient space is available in the storage system to restore the data to the storage system prior to initiating restoring of the data to the storage system; and wherein initiating restoring of data to the storage system from the storage medium comprises:
  initiating, by the computer system, restoring of data to the storage system from the storage medium when the sufficient space is available in the storage system to restore the data.

3. The method of claim 2 wherein initiating, by the computer system restoring of data to the storage system from the storage medium comprises:
  restoring, by the computer system, the data from the storage medium to the storage system when the sufficient space is available in the storage system to restore the data and the storage medium storing the data is available.

4. The method of claim 3 further comprising:
  receiving, by the computer system, a request to restore the data;
  determining, by the computer system, whether the storage medium containing the data to be restored is available; and
  initiating, by the computer system, a storage medium recall process for the storage medium when the storage medium is unavailable.

5. The method of claim 4, wherein determining, by the computer system, whether the storage medium containing the data to be restored is available comprises:
  identifying, by the computer system, object information for an object containing the data;
  identifying, by the computer system, the storage medium containing the object; and
  determining, by the computer system, whether the storage medium containing the object is available.

6. The method of claim 2, wherein initiating, by the computer system restoring of data to a storage system from the storage medium comprises:
  running, by the computer system, a data restoration process that retrieves the data from a backup of the data is stored in the storage medium.

7. The method of claim 2, wherein the amount of space available is total free space in the storage system as adjusted by a threshold limit.

8. The method of claim 1 further comprising:
  determining, by the computer system, whether the amount of space needed to complete restoring the data is less than the amount of space available after a period of time passes subsequent to placing the restoring of the data to the storage system on hold; and
  resuming, by the computer system, restoring the data to the storage system when the amount of space needed to complete restoring the data is no longer greater than the amount of space available.

9. The method of claim 1, wherein the storage medium is one of a tape, a magnetic tape, an optical tape, an optical disk, and a hard drive.

10. A data restore system comprising:
  a computer system that initiates restoring of the data to a storage system from a storage medium; identifies changes to an amount of space available in the storage system to restore the data while the data is being restored to the storage system; and places a restoring of the data to the storage system on hold when the amount of space needed to complete restoring the data is greater than the amount of space available to restore the data.

11. The data restore system of claim 10, wherein the computer system determines whether a sufficient space is available in the storage system to restore the data to the storage system prior to initiating restoring of the data to the storage system; and
  wherein in initiating restoring of data to the storage system from the storage medium, the computer system initiates restoring of data to the storage system from the storage medium when the sufficient space is available in the storage system to restore the data.

12. The data restore system of claim 11, wherein initiating, by the computer system restoring of data to a storage system from the storage medium, the computer system restores the data from the storage medium to the storage system when the sufficient space is available in the storage system to restore the data to the storage system and the storage medium storing the data is available.

13. The data restore system of claim 12, wherein the storage medium is one of a tape, a magnetic tape, an optical tape, an optical disk, and a hard drive.

14. The data restore system of claim 12, wherein the computer system
  receives a request to restore the data; determines whether the storage medium containing the data to be restored is available; and initiates a storage medium recall process for the storage medium when the storage medium is unavailable.

15. The data restore system of claim 14, wherein in determining whether the storage medium containing the data to be restored is available, the computer system identifies object information for an object containing the data; identifies the storage medium containing the object; and determines whether the storage medium containing the object is available.

16. The data restore system of claim 10, wherein the computer system determines whether the amount of space needed to complete restoring the data is less than the amount of space available after a period of time passes subsequent to placing the restoring of the data to the storage system on hold and resumes restoring the data to the storage system when the amount of space needed to complete restoring the data is no longer greater than the amount of space available.

17. The data restore system of claim 10, wherein in initiating, by the computer system restoring of data to a storage system from the storage medium, the computer system runs a data restoration process that retrieves the data from a backup of the data is stored in the storage medium.

18. A computer program product for restoring data, the computer program product comprising:
  a computer-readable storage media;
  first program code, stored on the computer-readable storage media, executable by the computer system to cause the computer system to initiate restoring of the data to a storage system from a storage medium;
  second program code, stored on the computer-readable storage media, executable by the computer system to cause the computer system to identify changes to an amount of space available in the storage system to restore the data while the data is being restored to the storage system; and
  third program code, stored on the computer-readable storage media, executable by the computer system to cause the computer system to place a restoring of the data to the storage system on hold when an amount of space needed to complete restoring the data is greater than the amount of space available to restore the data.

19. The computer program product of claim 18 further comprising:

fourth program code, stored on the computer-readable storage media, executable by a computer system to cause the computer system to determine whether a sufficient space is available in a storage system to restore the data to the storage system prior to initiating restoring of the data to the storage system; and fifth code, stored on the computer-readable storage media, executable by the computer system to cause the computer system to initiating restoring of data to the storage system from the storage medium when the sufficient space is available in the storage system to restore the data.

20. The computer program product of claim 18 further comprising:

fourth program code, stored on the computer-readable storage media, executable by the computer system to cause the computer system to determine whether amount of space needed to complete restoring the data is less than the amount of space available after a period of time passes subsequent to placing restoring of the data to the storage system on hold; and fifth program code, stored on the computer-readable storage media, executable by the computer system to cause the computer system to resume restoring the data to the storage system when the amount of space needed to complete restoring the data is no longer greater than the amount of space available.

* * * * *